Patented Aug. 9, 1949

2,478,229

UNITED STATES PATENT OFFICE 2,478,229

CONCENTRATED AQUEOUS COLLOIDAL DISPERSIONS OF POLYTETRAFLUOROETHYLENE AND METHODS FOR THEIR PREPARATION

Kenneth L. Berry, Hockessin, Del., assignor to E. I. du Pont de Nemours & Company, Wilmington, Del., a corporation of Delaware No Drawing. Application September 5, 1946, Serial No. 695,059

16 Claims. (Cl. 260—29.6)

This invention relates to polytetrafluoroethylene colloidal dispersions and more particularly to the preparation of polytetrafluoroethylene colloidal dispersions of high polymer content.

The outstanding stability of polytetrafluoroethylene to light, heat, solvents, electrical stresses, and chemical attack makes it highly desirable for use in many important applications such as those involving coating and impregnation. However, the application of this polymer in thin continuous adherent coats, for example to wire or other metallic substrates, and its impregnation into fibrous or porous structures of glass, metals, or ceramics, have hitherto not been possible. The insolubility of the polymer in all solvents precludes the use of solution techniques for achieving such results. Moreover, since polytetrafluoroethylene in the molten state has an extraordinarily high melt viscosity and tends to undergo physical disintegration when subjected to stresses leading to angular deformation, melt extrusion techniques for achieving such results have not been practicable.

Dilute aqueous colloidal dispersions of polytetrafluoroethylene have been obtained by polymerizing tetrafluoroethylene in the presence of water, but these are too dilute and too unstable for any practical utility in preparing polytetrafluoroethylene articles. I have now discovered methods for stabilizing and concentrating these dilute unstable dispersions, thereby preparing stable concentrated aqueous colloidal dispersions of polytetrafluoroethylene. I have, moreover, made the surprising discovery that polytetrafluoroethylene deposited from these colloidal dispersions can, despite the complete lack of any tendency for this polymer to flow when molten, be sintered to thin continuous films without the application of pressure, which was previously thought essential to the formation of continuous (i. e. homogeneous) molded objects of this polymer. I have further observed that polytetrafluoroethylene deposited from these concentrated colloidal dispersions on a metallic substrate, for example copper wire, and subsequently sintered, forms a thin continuous coating having excellent adhesion to the substrate. This result is all the more unexpected in that polytetrafluoroethylene is completely devoid of polar chemical groups which could promote adhesion to other materials, and has generally been noted for its tendency not to "wet," or adhere to, other materials.

It is emphasized that dispersions which are prepared in accordance with this invention are truly colloidal, having particle sizes of the order of 0.1 micron. Previous attempts to prepare dispersions of polytetrafluoroethylene by mechanical comminution of the polymer have failed to produce dispersions of such small particle size, and such dispersions have not been suitable for the preparation of thin continuous polymer films and coatings, as are the dispersions of this invention.

It is an object of this invention to provide a practical method for the preparation of stable concentrated polytetrafluoroethylene colloidal dispersions. A further object is to provide stable concentrated aqueous colloidal dispersions of polytetrafluoroethylene suitable for the preparation of continuous thin films and coatings.

These and other objects are accomplished by a process for concentrating dilute aqueous polytetrafluoroethylene dispersions which comprises adding a surface-active agent to the dispersion, flocculating the polymer by insolubilizing the surface-active agent, separating the flocculated polymer from the bulk of the aqueous phase, and forming a concentrated dispersion by peptization of the polymer floc. The resulting dispersions, containing at least 25% of polytetrafluoroethylene, represent an important part of this invention. The preferred dispersions contain 35% to 75% of polytetrafluoroethylene in aqueous colloidal dispersion, the polymer having a particle size of the order of 0.1 micron.

In practising this invention, both physical and chemical methods can be used to induce reversible flocculation by temporary insolubilization of the surface-active agent. Physical methods for producing reversible insolubilization of a surface-active agent include techniques involving the use of salts or a thermal change, while a change in pH illustrates how this can be accomplished by chemical means.

In the preferred manner of practising this invention, from 0.02 to 0.5% of a surface-active agent, based on the colloidal dispersion, is added to a dilute collidal dispersion containing from 2 to 8% polytetrafluoroethylene. A preferred method for performing this invention by a chemical procedure involves (1) flocculation of the polymer by addition of a 1% solution of a mineral acid to the dilute dispersion containing about 0.2% polyammonium styrene/maleamate; (2) separation of the floc from the major portion of the aqueous phase; and (3) peptization of the flocculated polymer with the resultant formation of a concentrated colloidal dispersion by addition of sufficient aqueous ammonium hydroxide to reform the polyammonium styrene/maleamate.

A preferred procedure for preparing concentrated polytetrafluoroethylene dispersions through use of a surface-active agent having a negative temperature coefficient of solubility involves (1) flocculation of the polymer by warming a dispersion containing 0.15% poly-N-vinylcaprolactam, based on the weight of the dispersion, to a temperature in the range of 30–50° C.; (2) separation of the floc from the warm aqueous phase by decantation or filtration; and (3) formation of a concentrated colloidal dispersion by cooling to below 30° C. and completing the redispersion by addition of another surface-active agent.

The preferred manner of practising this invention by the salting-out technique involves (1) dissolving in the dispersion containing an ionic surface-active agent, from 1 to 10%, based on the colloidal dispersion, of a water-soluble salt which is capable of causing the surface-active agent to precipitate out of 0.5% solution in water; (2) separation of the flocculated polymer from the major portion of the liquid by decantation; and (3) peptization of the flocculated polymer through a reduction in salt concentration to give a colloidal dispersion containing 35 to 75% polytetrafluoroethylene.

This invention is further illustrated by the following examples, in which parts are given by weight unless otherwise specified.

Example I

Five hundred parts of an aqueous colloidal dispersion containing 3.2% polytetrafluoroethylene is made neutral to litmus by addition of ammonia. To this dispersion 48 parts of a 1% aqueous solution of polyammonium styrene/maleamate is added. There is no apparent change. The resulting dispersion is acidified with 10 parts of 1% HCl, whereupon the polymer flocculates. The mixture is centrifuged and the clear supernatant liquid decanted. The sedimented polymer floc is made basic with 0.5 part of concentrated aqueous ammonium hydroxide (28%) and shaken. A colloidal dispersion containing 40.5% polytetrafluoroethylene results. Floc prepared as indicated in this example can be washed with deionized water before the addition of ammonium hydroxide.

Similar results are obtained when ammonium stearate is employed in place of polyammonium styrene/maleamate in the above example.

Example II

Twenty-five parts of an aqueous colloidal dispersion containing 4.1% polytetrafluoroethylene is added at room temperature (25° C.) to 4 parts of a 1% aqueous solution of poly-N-vinylcaprolactam. The dispersion is not changed in appearance until it is warmed to approximately 30° C., whereupon the polymer phase flocculates completely and starts to settle out of the liquid medium. After sedimentation is complete, the clear supernatant liquid is decanted from the polymer floc. The floc is allowed to cool to room temperature, upon which the polymer spontaneously peptizes to the colloidal condition. The peptization is extended essentially to completion by addition of 2%, based on the polymer, of a saturated long chain alkyl sodium sulfate. There results a concentrated colloidal dispersion of polytetrafluoroethylene containing about 40% of the polymer. Similar results are obtained when sodium dioctyl sulfosuccinate or a polyglycol ether is used in place of the saturated long chain alkylsodium sulfate.

Example III

Nine-hundredths (0.09) part by weight of a surface-active agent consisting of a saturated long chain alkyl sodium sulfate is dissolved at room temperature in 100 parts by weight of a colloidal dispersion of 4.2% by weight of polytetrafluoroethylene in water. To this highly dispersed colloidal system is added 2.7 parts by weight of sodium chloride. The system is agitated at room temperature until the salt dissolves, whereupon the colloidal polymer flocculates completely. The density differential between polymer and water phases then operates to produce rapid and complete sedimentation of the polymer. This process can be accelerated by centrifuging, which also produces a low sedimentation volume of the polymer. The supernatant liquid is then decanted, leaving flocculated polymer wet with an approximately 2.7% solution of sodium chloride. Water in sufficient quantity to reduce the salt concentration of the solution which wets the polymer to about 2% is added and the sedimented mixture agitated. The polymer peptizes and there results a 52.5% solids, highly fluid, colloidal dispersion of polytetrafluoroethylene in water.

Example IV

Sixteen parts by weight of a 1% solution of a surface-active agent which is the dioctyl ester of sodium sulfosuccinate is added to 100 parts of a colloidal dispersion of 3.2% polytetrafluoroethylene in water. In this solution 5.5 parts by weight of ammonium carbonate is dissolved at 25° C. The polymer flocculates completely, and a rapid and complete sedimentation of the polymer results. The settling of the polymer is accelerated by centrifuging, which also produces a low sedimentation volume of the polymer. The supernatant liquid is then decanted, leaving the sedimented polymer wet with an approximately 5% solution of ammonium carbonate. This sedimented, flocculated polymer mixture is heated at 80–100° C. until the larger part of the ammonium carbonate is driven off. The polymer is peptized in this operation and there is obtained a 59.5% solids, highly fluid, aqueous colloidal dispersion of polytetrafluoroethylene.

Use of 3 rather than 5.5 parts of ammonium carbonate gives essentially the same results if a temperature of 0° C. instead of 25° is employed.

Example V

Five hundred parts of a colloidal dispersion of 3.2% polytetrafluoroethylene in water is made neutral or slightly alkaline to litmus with ammonia. Eighty parts of a 1% aqueous dispersion of ammonium stearate is added to the colloid and the mixture is warmed to about 50° C. and then cooled to room temperature. To this is added 40 parts by weight of ammonium carbonate which dissolves rapidly. Flocculation of the polymer ensues and the floc is separated as in the foregoing examples. Sufficient water to effect peptization of the polymer is stirred into the floc and there results a 36.5% solids colloidal dispersion of polytetrafluoroethylene.

Suitable dilute aqueous colloidal dispersions containing from 0.5 to 15% of polytetrafluoroethylene are readily obtained by polymerization of tetrafluoroethylene in the presence of water. Use of peroxy catalysts in the polymerization, and preferably catalysts which act like peroxydisuccinic acid, leads to very useful dilute dispersions.

In general, the starting dispersions contain from 1 to 10%, and preferably from 2 to 8%, of the polytetrafluoroethylene, since such dispersions are readily obtained directly by polymerization of tetrafluoroethylene in the presence of water and lead to very attractive coating compositions upon concentration by the process of this invention.

In practising the invention, both ionic and non-ionic surface-active agents can be used. In techniques involving precipitation of the surface-active agent by addition of a salt, the ionic type is preferred since such agents are readily available and are effective in small quantities. Examples of suitable agents of this type are the anion-active variety such as the ammonium, alkali metal, and amine salts of carboxylic, sulfonic, and sulfuric acids containing a long aliphatic hydrocarbon chain, and of polymeric carboxylic acids, and cation-active agents such as quaternary ammonium salts containing an aliphatic hydrocarbon chain of from 8 to 18 or more carbon atoms. Suitable specific surface-active agents in addition to those used in the examples include ammonium pentadecane-8-sulfonate, sodium dodecylbenzenesulfonate, C-cetylbetaine, and stearyltrimethylammonium bromide. Mixtures of surface-active agents, such as the ammonium salts of sulfonated paraffin hydrocarbons having from 8 to 15 carbon atoms can also be used.

In the salting-out technique, a wide variety of water-soluble salts can be used to flocculate the polytetrafluoroethylene dispersion containing a surface-active agent. To be effective, the salt should not form an insoluble reaction product with the particular surface-active agent involved but should be capable of "salting" it out of a 1% aqueous solution. Salts having an ion in common with the surface-active agent are particularly effective in bringing out flocculation and are preferred. The use of an ammonium salt, particularly one volatile below 350° C., when used in combination with a surface-active agent which furnishes ammonium ions, leads to concentrated polytetrafluoroethylene dispersions which are markedly superior in many applications.

Absence of the salt from the final polytetrafluoroethylene article results in improved properties, and the thermolability of ammonium salts makes them easily eliminated by a simple heating operation. Other methods for eliminating the presence of salts from the final polytetrafluoroethylene article include the use of dialysis techniques and ion exchange resins on the concentrated dispersions. Ammonium salts which are decomposed by heating at a temperature below 100° C., for example ammonium carbonate and ammonium nitrite, are particularly preferred and they are very readily eliminated either by heating the concentrated dispersion or the final polytetrafluoroethylene article. Wire coatings, for example, having excellent adhesion, good abrasion resistance, and superior electrical properties are readily obtained by heating wires coated from concentrated dispersions even when the latter contain an ammonium salt.

In addition to the specific salts used in the examples, sodium sulfate, potassium nitrate, trimethylamine hydrochloride, ammonium chloride, ammonium nitrate, and other water-soluble ammonium, amine, and alkali metal salts give good results, particularly when used in combination with a surface-active agent having an ion in common with them. Alkaline earth and other polyvalent metal salts which are water-soluble and which do not form an insoluble reaction product with the surface-active agent can also be employed.

It is generally necessary to employ at least 0.1% of the salt, based on the dispersion, although in certain instances smaller quantities are effective. With most systems at least 0.5% salt is needed and the use of 1 to 10% of salt, based on the dispersion, is preferred, although larger quantities, up to the solubility limit in water at 25° C., can be employed.

Non-ionic surface-active agents are particularly useful when flocculation of the polytetrafluoroethylene is to be brought about by a change in temperature, that is, either by cooling or preferably by heating the dispersion containing the surface-active agent. In this type of procedure, poly-N-vinylcaprolactam has been particularly effective in that the floc resulting from heating a dispersion containing this agent is of such a character that it can be very readily separated from the aqueous phase by filtration as well as by decantation or centrifuging. Furthermore, the floc can be washed with water in contradistinction to salted-out floc, which must be washed by decantation with aqueous salt solutions in order to be redispersible. Water-soluble polyethers, such as polymethylvinyl ether and polyethylvinyl ether, can be similarly employed in place of poly-N-vinylcaprolactam.

When the insolubilization of the surface-active agent is to be brought about by a change in pH, that is for example, by the addition of a dilute acid to a surface-active agent of the anionic type or by addition of a base to one of the cationic variety, it is preferred that the acid from an anionic surface-active agent or the base from a cationic agent be a solid under process conditions in order to obtain a reversible floc. In addition to the polyammonium styrene/maleamate used in Example I, ammonium, amine, and alkali metal salts of long chain (8 to 18 carbon atoms) carboxylic, sulfonic, and sulfuric acids can be used in procedures involving addition of an acid, provided the free acid formed from the surface-active agent is a solid at the processing temperature. The use of a dilute acid, such as 0.2 to 2% hydrochloric, phosphoric, formic, or sulfuric acid, to bring about the insolubilization of an anionic surface-active agent is preferred, as best results have been obtained by such procedures. The use of polyammonium styrene/maleamate is particularly preferred in this type of procedure because high quality concentrated dispersions are readily obtained in this way.

In the process of this invention, the Brownian motion of the particles, which keeps the polytetrafluoroethylene in a dispersed state, is eliminated by the flocculation produced by insolubilization of the surface-active agent. In order to produce reversible flocculation, it is essential that inactivation of the surface-active agent be brought about by precipitation of the surface-active agent, or in the case of chemical procedures involving cationic or anionic agents, precipitation of the base or acid, respectively, of the surface-active agent. For example, inactivation of ammonium stearate by lowering the pH results in the formation of the insoluble solid stearic acid and a reversible floc is obtained.

After flocculation has been achieved, the excess liquid is readily removed by decantation since the large density differential between the polytetrafluoroethylene and water leads to a rapid and complete separation. Other, more elaborate separation methods, such as centrifugation or electroendosmosis, can also be employed, if desired. However in the present invention the polytetrafluoroethylene is grossly and quantitatively flocculated. Thus there is no fractionation of the polytetrafluoroethylene according to particle size with consequent loss of the smallest particles from the concentrate.

Attempts to concentrate the dilute dispersions obtained from the polymerization of tetrafluoroethylene directly by evaporation, centrifugation and other methods have not been satisfactory as considerable dispersed polymer is lost by coagulation or lack of sedimentation and contaminants are carried into the dispersion.

For many important applications, it is essential that the dispersion contain at least 25% of polytetrafluoroethylene and those containing from 35 to 75% are particularly useful and are preferred since they are more readily applied and yield superior final polytetrafluoroethylene articles. In addition to the use as coating materials for wire and other metal articles, fabrics, wood, ceramics, and carbon, such polytetrafluoroethylene dispersions are also useful as impregnants for metal structures made by casting or powder metallurgy techniques, for wire coils, for porous carbon and ceramic articles, and for fabrics whether they be constructed of natural or synthetic fibers, of organic, siliceous, or metallic materials. The dispersions are also useful as adhesives. They are particularly useful for casting unsupported films and sheets of polytetrafluoroethylene.

Dispersions of polytetrafluoroethylene with other materials can be made by adding colloidal solutions of dispersions of the latter, preferably to the concentrated dispersions of this invention. Particularly valuable dispersions are obtained by adding to the polytetrafluoroethylene dispersion colloidal solutions or dispersions of inorganic substances whose insolubility, heat resistance and chemical inertness properties are similar to those of the polytetrafluoroethylene. Examples of colloids useful for mixing with dispersions of polytetrafluoroethylene are those of silica, titania, alumina, zirconia, ferric hydroxide, and various metals, such as gold, silver, and the like.

Articles made from such dispersions comprise polytetrafluoroethylene filled with the other dispersed substance. The mixture of the two components is of a higher degree of intimacy than is attainable by any other method. The filling substance can be chosen for extending the polymer, altering its mechanical properties such as hardness, changing electrical properties such as dielectric constant, or coloring the resin.

As many apparently widely different embodiments of this invention may be made without departing from the spirit and scope thereof, it is to be understood that I do not limit myself to the specific embodiments thereof except as defined in the appended claims.

I claim:

1. A process for preparing a concentrated aqueous colloidal polytetrafluoroethylene dispersion which comprises adding a surface-active agent to a dilute aqueous dispersion of polytetrafluoroethylene, flocculating the polytetrafluoroethylene by insolubilizing the surface-active agent, separating the fluocculated polytetrafluoroethylene from the major portion of the aqueous phase, resolubilizing the surface-active agent and peptizing said polytetrafluoroethylene forming a concentrated aqueous colloidal dispersion containing at least 25% of colloidal polytetrafluoroethylene.

2. A process for preparing a concentrated aqueous colloidal polytetrafluoroethylene dispersion which comprises adding a surface-active agent to a dilute aqueous dispersion of polytetrafluoroethylene, flocculating the polytetrafluoroethylene by insolubilizing the surface-active agent, separating the flocculated polytetrafluoroethylene from the major portion of the aqueous phase by decantation, resolubilizing the surface-active agent and peptizing said polytetrafluoroethylene forming a concentrated aqueous colloidal dispersion containing from 35% to 75% of colloidal polytetrafluoroethylene.

3. A process for preparing a concentrated aqueous colloidal polytetrafluoroethylene dispersion which comprises adding to a dilute aqueous dispersion of polytetrafluoroethylene an ionic surface-active agent capable of forming a solid on insolubilization, insolubilizing the surface-active agent and flocculating the polytetrafluoroethylene by a change in pH of the dilute dispersion, separating the flocculated polytetrafluoroethylene from the major portion of the aqueous phase, and changing the pH of the flocculated polytetrafluoroethylene in the direction of its initial value thereby resolubilizing the surface-active agent and peptizing said polytetrafluoroethylene forming a concentrated aqueous colloidal dispersion containing at least 25% of colloidal polytetrafluoroethylene.

4. A process for preparing a concentrated aqueous colloidal polytetrafluoroethylene dispersion which comprises adding to a dilute aqueous dispersion of polytetrafluoroethylene an anionic type surface-active agent capable of forming a solid on insolubilization, insolubilizing the surface-active agent and flocculating the polytetrafluoroethylene by addition of a dilute acid to the dilute dispersion, separating the flocculated polytetrafluoroethylene from the major portion of the aqueous phase, and then adding a base to the flocculated polytetrafluoroethylene thereby resolubilizing the surface-active agent and peptizing said polytetrafluoroethylene forming a concentrated aqueous colloidal dispersion containing at least 25% of colloidal polytetrafluoroethylene.

5. A process for preparing a concentrated aqueous colloidal polytetrafluoroethylene dispersion which comprises adding to a dilute aqueous dispersion of polytetrafluoroethylene a cationic type surface-active agent capable of forming a solid on insolubilization, insolubilizing the surface-active agent and flocculating the polytetrafluoroethylene by addition of a base to the dilute dispersion, separating the flocculated polytetrafluoroethylene from the major portion of the aqueous phase, and then adding a dilute acid to the flocculated polytetrafluoroethylene thereby resolubilizing the surface-active agent and peptizing the polytetrafluoroethylene forming a concentrated aqueous colloidal dispersion containing at least 25% of colloidal polytetrafluoroethylene.

6. A process for preparing a concentrated aqueous colloidal polytetrafluoroethylene dispersion which comprises adding polyammonium styrene/maleamate to a dilute aqueous dispersion of polytetrafluoroethylene, insolubilizing the polyammonium styrene/maleamate and flocculating the polytetrafluoroethylene by addition of a dilute mineral acid to the dilute dispersion, separating the flocculated polytetrafluoroethylene from the major portion of the aqueous phase, and then adding to the flocculated polytetrafluoroethylene sufficient aqueous ammonium hydroxide to resolubilize the polyammonium styrene/maleamate and peptize said polytetrafluoroethylene forming a concentrated aqueous colloidal dispersion containing at least 25% of colloidal polytetrafluoroethylene.

7. A process for preparing a concentrated aqueous colloidal polytetrafluoroethylene dispersion which comprises adding to a dilute aqueous dispersion of polytetrafluoroethylene a non-ionic surface-active agent capable of being insolubilized in water by a thermal change, insolubilizing the surface-active agent and flocculating the polytetrafluoroethylene by changing the temperature of the dilute dispersion, separating the flocculated polytetrafluoroethylene from the major portion of the aqueous phase, and changing the temperature of the flocculated polytetrafluoroethylene in the direction of its initial value thereby resolubilizing the surface-active agent and peptizing said polytetrafluoroethylene forming a concentrated aqueous colloidal dispersion containing at least 25% of colloidal polytetrafluoroethylene.

8. A process for preparing a concentrated aqueous colloidal polytetrafluoroethylene dispersion which comprises adding poly-N-vinylcaprolactam to a dilute aqueous dispersion of polytetrafluoroethylene, insolubilizing the poly-N-vinylcaprolactam and flocculating the polytetrafluoroethylene by warming the dilute dispersion to a temperature in the range of 30° to 50° C., separating the flocculated polytetrafluoroethylene from the major portion of the aqueous phase, and cooling the flocculated polytetrafluoroethylene below 30° C. thereby resolubilizing the poly-N-vinylcaprolactam and peptizing said polytetrafluoroethylene forming a concentrated aqueous colloidal dispersion containing at least 25% of colloidal polytetrafluoroethylene.

9. A process for preparing a concentrated aqueous colloidal polytetrafluoroethylene dispersion which comprises adding an ionic surface-active agent to a dilute aqueous dispersion of polytetrafluoroethylene, insolubilizing the surface-active agent and flocculating the polytetrafluoroethylene by adding to the dilute dispersion a water-soluble salt capable of salting-out said surface-active agent, separating the flocculated polytetrafluoroethylene from the major portion of the aqueous phase, and then adding sufficient water to reduce the salt concentration thereby resolubilizing the surface-active agent and peptizing said polytetrafluoroethylene forming a concentrated aqueous colloidal dispersion containing at least 25% of colloidal polytetrafluoroethylene.

10. A process for preparing a concentrated aqueous colloidal polytetrafluoroethylene dispersion which comprises adding an ionic surface-active agent to a dilute aqueous dispersion of polytetrafluoroethylene, insolubilizing the surface-active agent and flocculating the polytetrafluoroethylene by adding to the dilute dispersion a water-soluble salt having an ion in common with the surface-active agent, separating the flocculated polytetrafluoroethylene from the major portion of the aqueous phase, and then adding sufficient water to reduce the salt concentration thereby resolubilizing the surface-active agent and peptizing the polytetrafluoroethylene forming a concentrated aqueous colloidal dispersion containing at least 25% of colloidal polytetrafluoroethylene.

11. A process for preparing a concentrated aqueous colloidal polytetrafluoroethylene dispersion which comprises adding a saturated long chain alkyl sodium sulfate to a dilute aqueous dispersion of polytetrafluoroethylene, insolubilizing the alkyl sodium sulfate and flocculating the polytetrafluoroethylene by addition of sodium chloride to the dilute dispersion, separating the flocculated polytetrafluoroethylene from the major portion of the aqueous phase, and then adding sufficient water to reduce the sodium chloride concentration thereby redissolving the alkyl sodium sulfate and peptizing the polytetrafluoroethylene forming a concentrated aqueous colloidal dispersion containing at least 25% of colloidal polytetrafluoroethylene.

12. A process for preparing a concentrated aqueous colloidal polytetrafluoroethylene dispersion which comprises adding ammonium stearate to a dilute aqueous dispersion of polytetrafluoroethylene, insolubilizing the ammonium stearate and flocculating the polytetrafluoroethylene by addition of ammonium carbonate to the dilute dispersion, separating the flocculated polytetrafluoroethylene from the major portion of the aqueous phase, and then adding sufficient water to reduce the ammonium carbonate concentration thereby redissolving the ammonium stearate and peptizing the polytetrafluoroethylene forming a concentrated aqueous colloidal dispersion containing at least 25% of colloidal polytetrafluoroethylene.

13. A process for preparing a concentrated aqueous colloidal polytetrafluoroethylene dispersion which comprises adding an ionic surface-active agent to a dilute aqueous dispersion of polytetrafluoroethylene, insolubilizing the surface-active agent and flocculating the polytetrafluoroethylene by addition of an ammonium salt to the dilute dispersion, separating a flocculated polytetrafluoroethylene from the major portion of the aqueous phase, and heating the flocculated polytetrafluoroethylene until sufficient ammonium salt is driven off to redissolve the surface-active agent and peptize the polytetrafluoroethylene forming a concentrated aqueous colloidal dispersion containing at least 25% of colloidal polytetrafluoroethylene.

14. A process for preparing a concentrated aqueous colloidal polytetrafluoroethylene dispersion which comprises adding a polymeric carboxylic acid surface-active agent to a dilute aqueous dispersion of polytetrafluoroethylene, insolubilizing said polymeric carboxylic acid and flocculating the polytetrafluoroethylene by addition of a dilute acid to the dilute dispersion, separating the flocculated polytetrafluoroethylene from the major portion of the aqueous phase and then adding a base to the flocculated polytetrafluoroethylene thereby resolubilizing said polymeric carboxylic acid and peptizing said polytetrafluoroethylene forming a concentrated aqueous colloidal dispersion containing at least 25% of polytetrafluoroethylene.

15. A process as set forth in claim 7 in which said non-ionic surface-active agent is a water-soluble polyether.

16. A concentrated aqueous colloidal dispersion containing at least 25% polytetrafluoroethylene having a particle size of the order of 0.1 micron, said concentrated colloidal dispersion being obtained by adding a surface-active agent to a dilute aqueous dispersion of polytetrafluoroethylene, flocculating the polytetrafluoroethylene by insolubilizing the surface-active agent, separating the flocculated polytetrafluoroethylene from the major portion of the aqueous phase to give a concentration of at least 25% polytetrafluoroethylene, resolubilizing the surface-active agent and peptizing said polytetrafluoroethylene forming at least a 25% concentrated aqueous colloidal dispersion thereof.

KENNETH L. BERRY.

REFERENCES CITED

The following references are of record in the file of this patent:

UNITED STATES PATENTS

| Number | Name | Date |
|---|---|---|
| 2,227,200 | Roble | Dec. 31, 1940 |
| 2,386,287 | Blanco et al. | Oct. 9, 1945 |
| 2,393,967 | Brubaker | Feb. 5, 1946 |